United States Patent [19]
Messmer et al.

[11] Patent Number: 6,050,727
[45] Date of Patent: Apr. 18, 2000

[54] HYDROSTATICALLY SUPPORTED TILTING PAD JOURNAL BEARING IMPROVEMENTS

[75] Inventors: George A. Messmer, San Francisco, Calif.; Lyle A. Branagan, Gastonia, N.C.

[73] Assignee: Pioneer Motor Bearing Company, South San Francisco, Calif.

[21] Appl. No.: 08/833,761

[22] Filed: Apr. 9, 1997

[51] Int. Cl.[7] .................................................. F16C 17/03
[52] U.S. Cl. ............................................. 384/99; 384/117
[58] Field of Search .............................. 384/99, 117, 100, 384/311, 312

[56] References Cited

U.S. PATENT DOCUMENTS

| | | |
|---|---|---|
| 3,549,215 | 12/1970 | Hollingsworth . |
| 3,658,488 | 4/1972 | Brown et al. . |
| 4,002,472 | 1/1977 | LeBrasse et al. . |
| 4,059,318 | 11/1977 | Hollingsworth . |
| 4,189,194 | 2/1980 | Davies . |
| 4,300,808 | 11/1981 | Yoshioka . |
| 4,333,215 | 6/1982 | Swanger . |
| 4,362,020 | 12/1982 | Meacher et al. . |
| 4,904,537 | 2/1990 | Lytwynec . |
| 5,304,006 | 4/1994 | Ide .......................................... 384/117 |
| 5,397,183 | 3/1995 | Lu et al. . |
| 5,421,655 | 6/1995 | Ide et al. . |
| 5,489,155 | 2/1996 | Ide . |

OTHER PUBLICATIONS

Fluid Pivot Journal Bearings, Pioneer Motor Bearing Co., 1974, entire brochure, pp. 1–15.

Nelson, et al., "*The Fluid Pivot Journal Bearing,*" Journal of Lubrication Technology; The American Society of Mechanical Engineers, Jan. 1977, pp. 1–6.

Wilcock, "*The Hydrodynamic Pocket Bearing,* "Trans. A.S.M.E. APr. 1955, pp. 311–319.

*Primary Examiner*—Lenard A. Footland
*Attorney, Agent, or Firm*—Coudert Brothers

[57] ABSTRACT

Applicant's invention defines an improved tilting pad journal bearing having a shell with an inner surface which is dimensionally coincident with yet slightly larger than the geometry of the outer surface of its bearing pads, said pads provided with ramps on opposite radial edges to engage at least one pad stop, said pad having a conduit for passing lubricant such that when the shaft rotates, a hydrodynamic lubricant film is generated placing a hydrostatic pressure between said pads and said shell, said pressure measured by at least one pressure sensor which in turn provides an indication of direct loading of the bearing by the shaft.

5 Claims, 4 Drawing Sheets

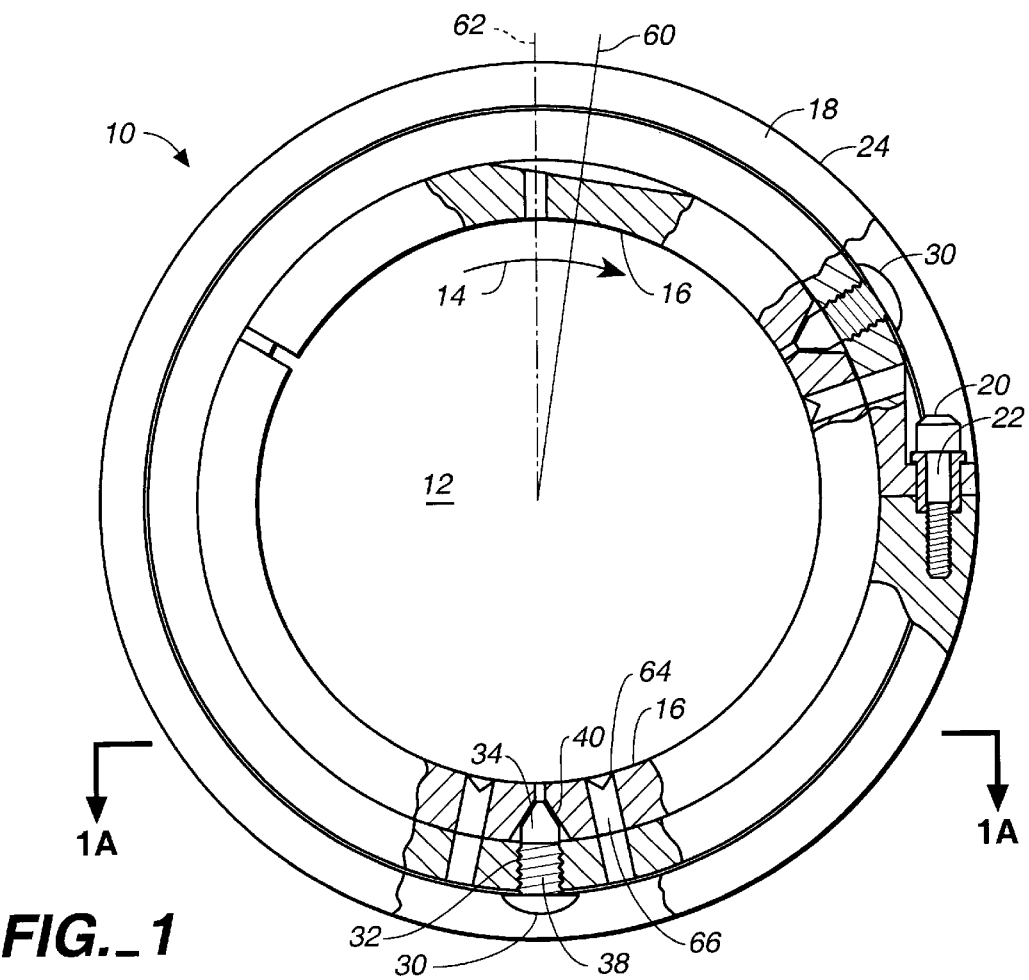
FIG._1
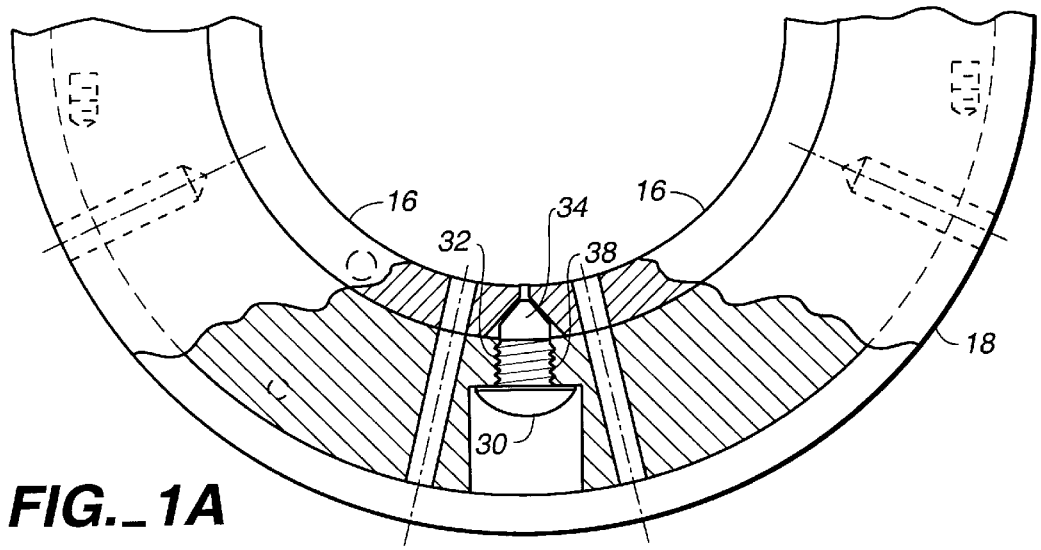
FIG._1A

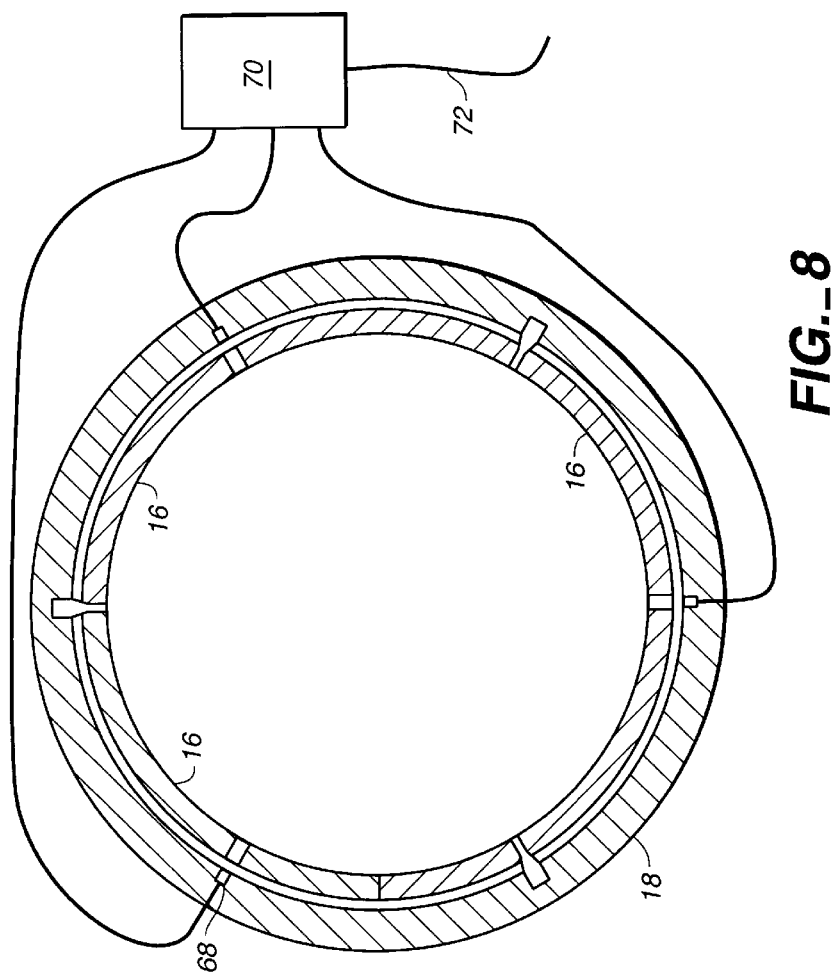
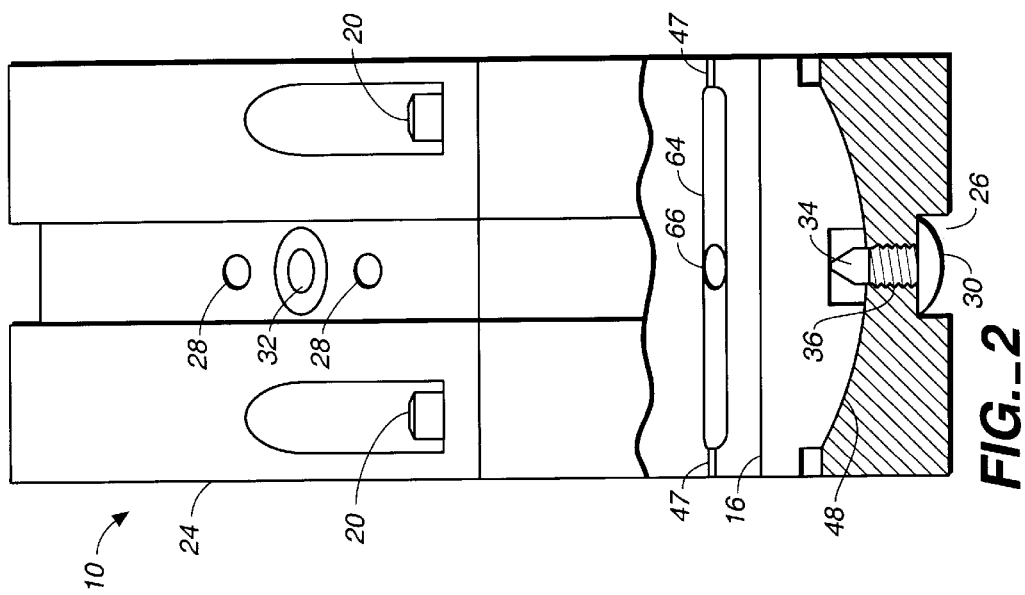

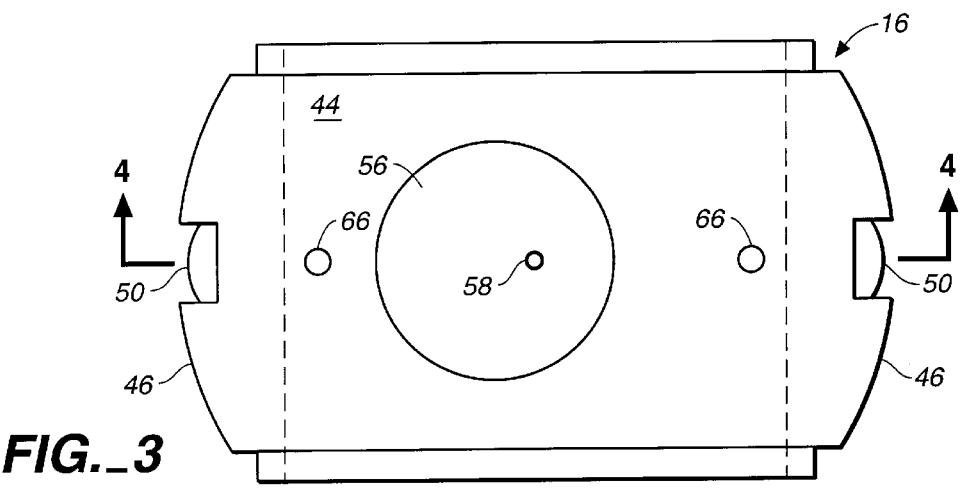
FIG._3
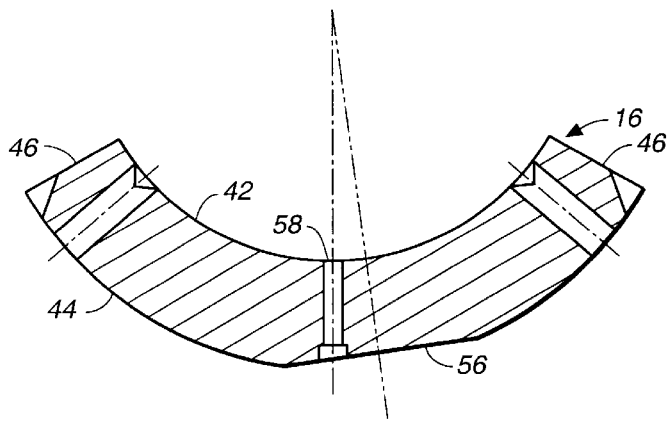
FIG._4
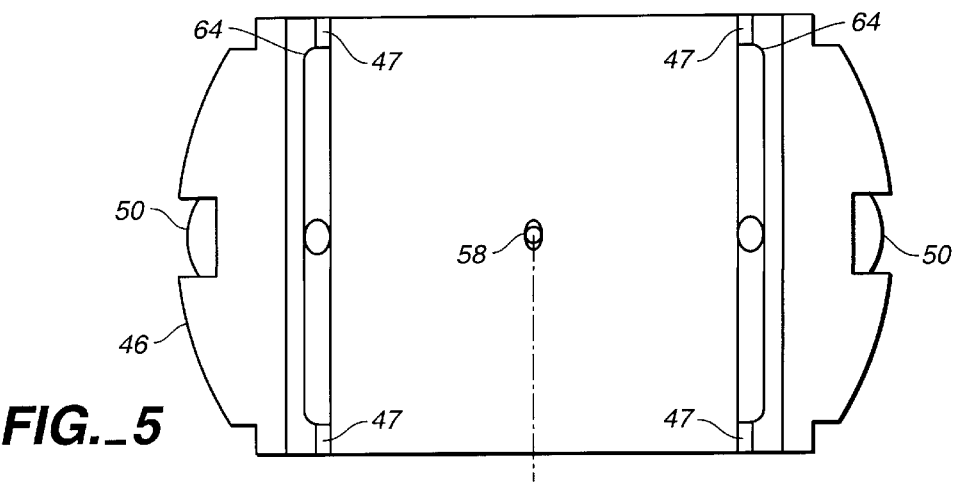
FIG._5

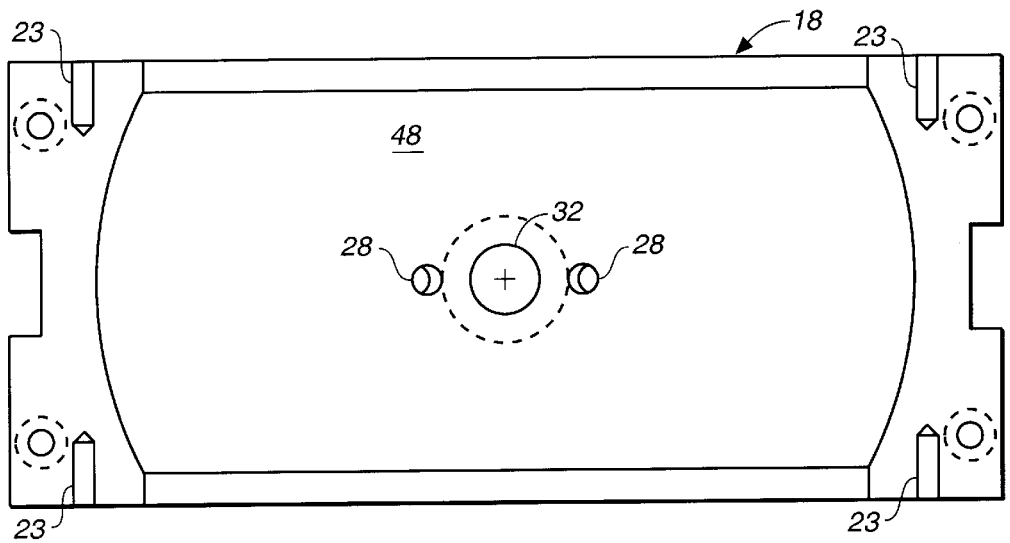
FIG._6
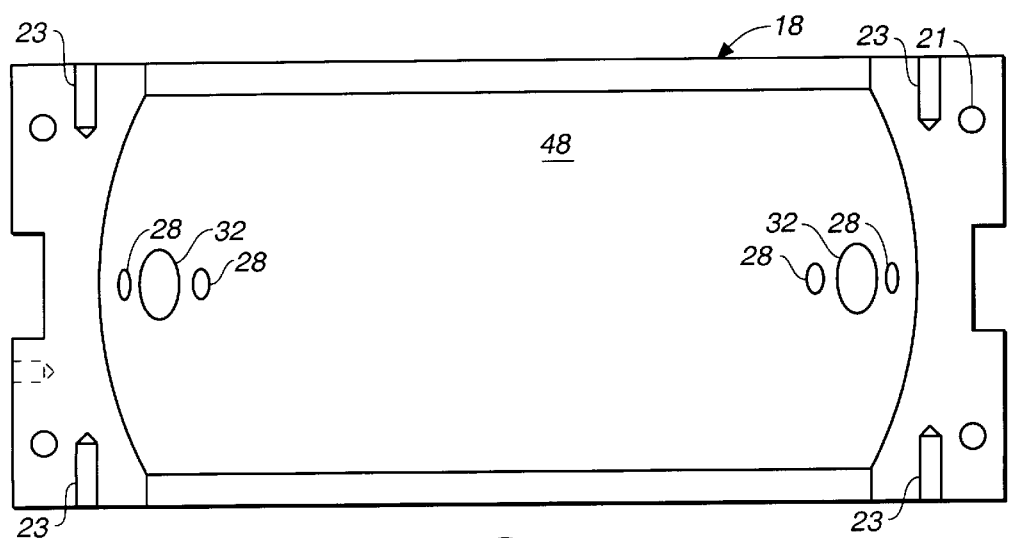
FIG._7

HYDROSTATICALLY SUPPORTED TILTING PAD JOURNAL BEARING IMPROVEMENTS

FIELD OF THE INVENTION

The present invention relates to the field of tilting pad journal bearings and particularly to tilting pad journal bearings that generate a hydrodynamic lubricant film for hydrostatic support of the pads.

BACKGROUND OF THE INVENTION

Increasing performance, price, and reliability demands for advanced machinery such as modern high-speed compressors, gas turbines, steam turbines, gearboxes, and the like, have resulted in complex design requirements for bearings. Of the variety of bearing designs employed to minimize rotating shaft bearing instabilities, the tilting pad concept has been the most successful. But conventional flood-lubricated, mechanically-pivoted tilting-pad journal bearings have several disadvantages, including relatively high power loss, mechanical complexity, pivot fretting, limited damping capacity, and indirect measurement of bearing loading.

An alternative tilting pad journal bearing was developed which uses the hydrodynamic pressure formed by the rotation of the journal in the wedge-shaped lubricant film as a source of hydrostatic pressure to support each pad. Such hydrostatically supported tilting pad journal bearings are described in U.S. Pat. No. 3,549,215 and U.S. Pat. No. 4,059,318, assigned during their term to the assignee of the present invention, and hereby incorporated by reference into this application. The aforementioned designs avoid high power losses inherent with flooded lubrication in favor of providing lubrication directed to the leading and trailing edges of each pad. Lacking mechanical pivots, fretting is also avoided and bearing damping is enhanced by means of the hydrostatic film supporting each pad.

Among the factors which must be taken into account when designing such bearings are mechanically and thermally induced shaft misalignment. Conventional bearings often rely on a spherical fit between the outside diameter of the stationary, carrier ring, or as it is commonly referred to, bearing shell, and the inside diameter of the machine's housing to promote alignment between the shaft and bearing surfaces. In spite of several patents improving the spherical fit, such a purely mechanical solution has not proven entirely satisfactory. Frictional resistance to the motion of the bearing shell within this spherical fit reduces the capability of the bearing to track the axial tilt of the shaft. This results in uneven axial bearing loading and elevated, possibly damaging, localized temperatures.

In an industrial bearing application, the direct load applied by the rotating element to the bearing is generally not measured due to cost and conceptual limitations. In some machines temperature sensors or vibration sensors are used to provide an indication of expected relative bearing loading. But, these indirect measurements may instead reflect factors other than load and therefor are an inadequate measure of bearing loading. It is anticipated that direct measurement of bearing loading during operation would allow potential alignment correction of the machinery and aid in the diagnosis of operational performance or fault conditions; particularly ripe for such analysis would be rigidly-coupled rotating elements having more than two bearings per span which, in terms of bearing loading, can be described as "statically in determinant."

Two major areas of concern not yet satisfactorily addressed by bearing designs to date are 1) direct measurement of bearing loading and 2) stable bearing operation under varying conditions of axial tilt of the rotating element.

SUMMARY OF THE INVENTION

The present invention utilizes a plurality of spherical-backed tilting pads, typically three or more, which are located in a shell whose inside diameter is slightly larger, but of the same geometry as that of the tilting pads' outer face. The tilting pads are provided with a shallow cavity on their outer face, which is in fluid communication with said pads' inner faces. Each cavity is positioned at a predetermined range downstream of said pad's centerline.

The action of rotation of the shaft creates a hydrodynamic film which generates a hydrostatic film on the back of each pad by forcing lubricant through a passage extending from each pad inner face to each pad outer face. Because of the forces provided by the hydrostatic film, the pad is allowed to "follow" the shaft as it changes position due to misalignment until force and momentum equilibrium is obtained for any operating condition. The spherical backing of the pads allows the bearing to support the shaft during both radial motion and axial misalignment without compromising the performance of the hydrostatic film.

Direct bearing load is measured by monitoring the hydrostatic pressure of said lubricant in said cavity by use of capacitive or piezo-resistive transducers mounted flush with said shell's inner diameter and spaced radially opposite said cavity in said pad.

BRIEF DESCRIPTION OF THE DRAWINGS

FIG. 1 is an end view of a spherical-backed, hydrostatically supported tilting pad journal bearing of the present invention, partly in section, showing in detail the improvements provided by the present invention;

FIG. 1A is a cross-sectional view partly in section of FIG. 1 showing the structure of the pad stops and their orientation relative to the bearing pads;

FIG. 2 is a side view, partly in section, of the bearing of FIG. 1;

FIG. 3 is a plan view of the outer face of one of the spherical-backed tilting pads;

FIG. 4 is a cross-sectional view of the pad taken along line 4—4 in FIG. 3;

FIG. 5 is a plan view of the inner face of one of the tilting pads showing a spreader groove and bleeder grooves;

FIG. 6 is a plan view of one half of a split bearing shell in an embodiment employing three spherical-backed tilting pads;

FIG. 7 is a plan view of the mating half of the split bearing shell of FIG. 6; and FIG. 8 is a front cross-sectional view of a bearing shell and associated tilting pads demonstrating the location of the pressure sensors in the shell opposite the cavity provided on the outer face of the pads.

DETAILED DESCRIPTION OF THE INVENTION

In a preferred embodiment of the present invention shown in FIG. 1, a tilting pad journal bearing is shown and generally designated by reference numeral 10. FIG. 1 shows the relative positions of features of the tilting pad journal bearing. For purposes of clarity of illustration, some features in FIG. 1 may not be to scale. A shaft 12 (not shown), rotating in a direction 14 is supported by three spherical-backed tilting pads 16 which in turn are located in a shell 18. Bearing shell 18 is usually a split ring held together by at least one bolt 20 and maintained in alignment using at least one alignment bushing or dowel 22. The preferred embodiment, shown in FIGS. 6 and 7 utilize a plurality of bolts 20 (not shown), passing through bores in the shell upper half, engaged in threaded holes 21 in the shell lower half. A plurality of dowels (not shown) are fitted in receivers 23 to maintain alignment of the two shell halves. However, the shell may also be of single piece construction. The bearing shell is usually contained in a bearing pedestal or a machine's housing (not shown). Referring again to FIG. 1, the outer surface 24 of bearing shell 18 is provided with an annular channel 26 which supplies lubricant to the leading and trailing edges of each pad via drilled ports 28.

In the preferred embodiment, positioned between each adjacent tilting pad 16, are pad stops 30 as shown in FIG. 1A. The pad stops 30, typically comprise a threaded fastener ending in a cam section 34, relieved by a short stem section 38. Threaded pad stops 30 loosely retain pads 16 in their appropriate position in shell 18 while in operation, and provide minimal frictional contact with each pad's downstream ramp. Pad stops 30 are mounted in shell 18 by using threaded apertures 32 provided therefor. Alternate means of mounting said pad stops may include, but are not limited to friction fit, welding, adhesive or other rigid means.

As seen in FIGS. 3 and 4, tilting pads 16 are defined by inner and outer faces 42 and 44 respectively, opposing radial faces 46 and opposing parallel focus 47. The inner face 42 has substantially the same diameter as shaft 12. Similarly, the outer face 44 of each tilting pad 16 is provided a geometry sufficient to allow it to conform to the spherical surface 48 of bearing shell 18. In each case, there is an operating clearance between each contacting pair; inner face 42 and shaft 12, and outer face 44 and surface 48. These operating clearances allow the tilting pads to align themselves with the shaft as it changes position due to a variety of dynamic influences, including among others, thermal and mechanical distortions.

Each tilting pad 16 is provided with ramps 50, which are machined into the axial center of each pad's radial face 46 and spherical surface 44, (See FIG. 3). Ramp surface 52 is generally circular in nature with a uniform radius of curvature measured from a predetermined point along the radial centerline of the tilt pad.

A shallow recess or cavity 56 is provided on outer face 44 of each tilting pad 16. Said cavity 56 is in communication with inner face 42 by lubricant passage 58 (See FIGS. 3 and 4). As FIGS. 1 and 4 indicate, cavity 56 is machined into the outer face 44 of the tilting pads so that the center line 60 of the cavity is positioned at or downstream of the geometric center line 62 of the pad with reference to the proposed direction of shaft rotation 14. In the preferred embodiment, a circular shaped cavity 56 is used, although other shapes, such as square, rectangular, or elliptical may be employed.

Axial-aligned spreader grooves 64 are provided on the inner face 42 of each tilting pad 16 proximate to each radial end face 46 as shown in FIGS. 4 and 5. Each spreader groove 64 is in communication with outer face 44 of each pad 16, via conduits 66. Lubrication of the shaft and generation of the "hydrodynamic wedge," as it is commonly known, is facilitated by passage of lubricant along the spreader grooves. Depending on the bearing thermal requirements, communication for the lubricant between spreader grooves 64 and the axial pad end faces 47 may be provided in the form of bleed grooves 67.

During operation of the bearing of the present invention, channel 26, enclosed in a bearing pedestal or a machine's housing (not shown), is filled with low pressure lubricant, typically in the range of 10–25 psig. The lubricant is communicated to the pads 16 via passages 28, which reside in predetermined locations around shell 18, and thereby, to the inner face 42 of the pads, via conduits 66 and spreader grooves 64. Lubricant is picked up from the spreader grooves 64 during shaft 12 rotation, thereby forming a hydrodynamic wedge and providing the separating film between the inner faces 42 of pads 16 and shaft 12.

The action of rotation of shaft 12, forming the hydrodynamic wedge and forcing lubricant through passage 58 to cavity 56 creates a hydrostatic film on the back of each pad. Because of the forces provided by the hydrostatic film, the pads are allowed to "lift" radially inward, circumferentially pitch or tilt, and rotate in the spherical shell to "follow" the shaft as it changes position, until force and momentum equilibrium is obtained for any operating condition.

In the present invention, the spherical geometry of the outer faces 44 of the pads 16, coincident with the similar spherical surface 48 of shell 18, allows the bearing to compensate for movement of shaft 12 not only in the radial direction, but with great forgiveness in cases of axial tilt or misalignment because mating surfaces 44 and 48 are hydrostatically lubricated.

FIGS. 6 and 7 show the mating halves of the split shell 18 of the preferred embodiment. Also shown in these figures are the drilled ports 28 and the passage 58 which admit oil to the bearing pads (not shown) such that a hydrostatic pressure build up is achieved between the pads and spherical surface 48.

As seen in FIG. 8, a pressure sensor 68 is mounted in bearing shell 18 radially opposite the center of cavity 56 of each pad 16. In the preferred embodiment, sensor 68 comprises a thin radial dimension to eliminate any interference between shell 18 and the machine housing or bearing pedestal within which it is located. Sensor 68 provides a true static pressure measurement from the hydrostatic cavity behind each pad 16. Typical sensors used in this embodiment are either capacitive or piezo-resistive sensors. Sensor 68 is mounted "flush" with the arcuate surface 48 of bearing shell 18 in order to provide limited dynamic pressure readings, by either contouring the end of said sensor to the shape of said surface 48, or by providing a small shallow cavity in said surface which communicates from the hydrostatic film to the sensor face. In an embodiment utilizing a shallow cavity, venting of any entrained air from the shallow cavity must be accomplished to eliminate unwanted affects to the dynamic response of the sensor.

The output of each sensor 68 is combined by either analog or digital signal conditioning means 70. By such means, a gain is achieved which relates the hydrostatic cavity pressure to the integrated force on the pad and which provides a vector summation based on the orientation of the pads with respect to the bearing split-line (or other radial reference direction). The gain factors can be of single value for a particular design or a range of values selected by means of additional measurements of: lubricant temperature, shaft tilt angle, or other governing factors. The preferred embodiment employs analog signal conditioning (operational amplifiers with resistors and capacitors sized for the sensors) with fixed gains for a horizontal and vertical reference direction yielding an output with a large value of electrical impedance (gain values are a function of only the pressure sensor scale factor and the geometry of surface 44. The output of the sensors is typically conditioned external to the bearing, with electrical connections to each of the transducers. Typical output 72 is in terms of vertical and horizontal bearing load. The output may be displayed by some combination of local display or connection to the general machine monitoring hardware. For small bearings, the pressure transducers may need to be mounted externally on the bearing shell. For larger bearings in a mild thermal environment, it should be possible to mount the signal conditioning hardware, directly within the bearing shell, eliminating external hardware.

Digital measurements may also be provided for communication with a plant process computer or similar digital computation devise. In such an embodiment, computation of bearing load from pressure signals would then be made by means of equations implemented in software. Such computations would be made at discrete time intervals. While the preferred embodiment utilized static load measurement as a source of diagnostic information, alarm and trip functions could be readily added for specific applications. Alarm or trip values could be specified based on the total load, i.e. a vector sum of the horizontal and vertical components or on a particular load component.

While the invention has been described in connection with what is presently considered the most practical and preferred embodiment(s), it is to be understood that the invention is not limited to the disclosed embodiment(s) but, on the contrary is intended to cover various modifications and equivalent arrangements included within the scope of the appended claims.

What is claimed is:

1. A tilting pad journal bearing for supporting a rotatable shaft comprising:

a plurality of bearing pad segments disposed in surrounding relation to the shaft, each of the bearing pad segments including opposed ends, an arcuate inner face, a spherical outer face, a circumferentially extending cavity in the outer face, and a conduit to establish fluid communication between the inner face and the cavity;

a shell having a spherical inner surface for supporting the bearing pads;

a pad stop for placement between adjacent pad segments, each pad stop having a cam section and a means thereon for mounting the pad stop to the shell at a location between adjacent ends of the pad segments, which are relatively convergent as the cam section of the pad stop is approached;

a lubricant contained within the bearing from which is hydrodynamically generated a lubricant film when the shaft is rotating that is communicated via the conduit to and accumulated by the cavity of each of the pad segments to provide a hydrostatic support upon which each pad segment may be pivotally supported, the cam section of each pad stop being in confronting relation to one of the opposed ends of each of the pad segments to define a clearance that allows each pad segment to pivot about its center in both the axial and the circumferential directions; and at least one hydrostatic pressure sensor mounted in the inner surface of the shell means and radially opposite the center of the cavity, the sensor providing an output representing the direct loading exerted on the pad by the shaft.

2. The tilting pad journal bearing of claim 1, the radial centerline of the cavity being in the range of 0°–12° of the radial centerline of the bearing pad segment in a direction downstream of the latter with reference to the direction of the rotation of the shaft.

3. The tilting pad journal bearing of claim 1, wherein each of the adjacent ends of each of the pad segments includes a ramp adapted to be in confronting and generally opposing relation to the cam section of the pad stop adjacent thereto.

4. An improved tilting pad journal bearing for supporting a rotatable shaft and having a plurality of bearing pad segments that are hydrostatically supported by a hydrodynamically generated lubricant film and shell means for supporting the bearing pad segments in surrounding relation to the shaft, the improvement comprising:

a bearing pad having a pair of opposed ends, an arcuate inner face, a spherical outer face dimensionally coincident with or just slightly smaller than said shell's inner surface, a circumferentially extending cavity in said outer face, the radial centerline of said cavity being located in the range of 0°–12° of the radial centerline of the bearing pad in a direction downstream of the latter with reference to the direction of rotation of the shaft, and a conduit that communicates the hydrodynamically generated lubricant film to the cavity to provide hydrostatic, pivotal support of the bearing pad when the shaft is rotating, thereby allowing the bearing pad to pivot about its center in both axial and radial directions;

at least one hydrostatic pressure sensor mounted in the inner surface of the shell means and radially opposite the cavity, the sensor providing an output representing the direct loading exerted on the pad by the shaft.

5. An improved tilting pad journal bearing for supporting a rotatable shaft and having a plurality of bearing pad segments supported in engaging relation with the shaft by a shell means, said pads hydrostatically supported in said shell means by a lubricant film hydrodynamically generated by the motion of said shaft, the improvement comprising:

at least one hydrostatic pressure sensor mounted in the inner surface of the shell means and radially opposite one of said pad segments, the sensor providing an output representing the direct loading exerted on the pad by the shaft.

* * * * *

CERTIFICATE OF CORRECTION

PATENT NO: 6,050,727

DATED: April 18, 2000

INVENTOR(S): George A. Messmer, et al.

It is certified that error appears in the above-identified patent and that said Letters Patent are hereby corrected as shown below:

[54] Title, Line 2:     Delete "Improvements"

Signed and Sealed this

Third Day of April, 2001

Attest:

NICHOLAS P. GODICI

*Attesting Officer*     Acting Director of the United States Patent and Trademark Office